United States Patent [19]

Marion et al.

[11] 4,392,869

[45] * Jul. 12, 1983

[54] HIGH TURNDOWN PARTIAL OXIDATION PROCESS

[75] Inventors: Charles P. Marion, Mamaroneck; Albert Brent, Huntington; George N. Richter, San Marino; William B. Crouch, Chappaqua; Edward T. Child, Tarrytown, all of N.Y.; Blake Reynolds, Riverside, Conn.

[73] Assignee: Texaco Inc., White Plains, N.Y.

[ * ] Notice: The portion of the term of this patent subsequent to Sep. 28, 1999, has been disclaimed.

[21] Appl. No.: 272,415

[22] Filed: Jun. 10, 1981

Related U.S. Application Data

[60] Division of Ser. No. 167,876, Jul. 14, 1980, Pat. No. 4,351,645, which is a continuation-in-part of Ser. No. 107,215, Dec. 26, 1979, Pat. No. 4,338,099.

[51] Int. Cl.³ .............................................. C10J 3/46
[52] U.S. Cl. .................................... 48/197 R; 48/206; 252/373
[58] Field of Search ..................... 48/197 R, 200, 201, 48/203, 206, 209, 212, 215, DIG. 7, 95, 86 R, 61, 180 F, 180 C, 180 P, 87, 77, 63, 64, 73; 252/373; 431/2, 190, 11, 6; 110/261, 347; 137/9, 100

[56] References Cited

U.S. PATENT DOCUMENTS

| | | | |
|---|---|---|---|
| 3,418,062 | 12/1968 | Hovis et al. | 431/350 |
| 3,607,157 | 9/1971 | Schlinger et al. | 48/206 |
| 3,945,942 | 3/1976 | Marion et al. | 48/197 R |
| 4,065,250 | 12/1977 | Schliefer et al. | 431/90 |
| 4,111,637 | 9/1978 | Hillman et al. | 431/90 |
| 4,277,254 | 7/1981 | Hanson | 48/180 P |

*Primary Examiner*—Peter F. Kratz
*Attorney, Agent, or Firm*—Carl G. Ries; Robert A. Kulason; Albert Brent

[57] ABSTRACT

A burner and partial oxidation process for producing synthesis gas, fuel gas or reducing gas from slurries of solid carbonaceous fuel and/or liquid or gaseous hydrocarbon fuel. The burner has a high turndown feature and comprises a central conduit; a central bunch of parallel tubes that extend longitudinally through said central conduit; an outer conduit coaxial with said central conduit and forming an annular passage therewith; and an annular bunch of parallel tubes that extend longitudinally through said annular passage; and wherein the downstream ends of said central and annular bunches of parallel tubes are respectively retracted upstream from the burner face a distance of about 0 to 12 i.e. 3 to 10 times the minimum diameter of the central exit orifice and the minimum width of the annular exit orifice. Three ranges of flow through the burner may be obtained by using one or both bunches of tubes and their surrounding conduits. Throughput levels may be rapidly changed—up and down—without sacrificing stable operation. A control system is presented for varying the flow rates of the oxidant and fuel streams and/or for switching the reactant streams through one or both sections of the subject burner, thereby effecting a rapid turndown of the burner and in the production of the effluent gas.

5 Claims, 4 Drawing Figures

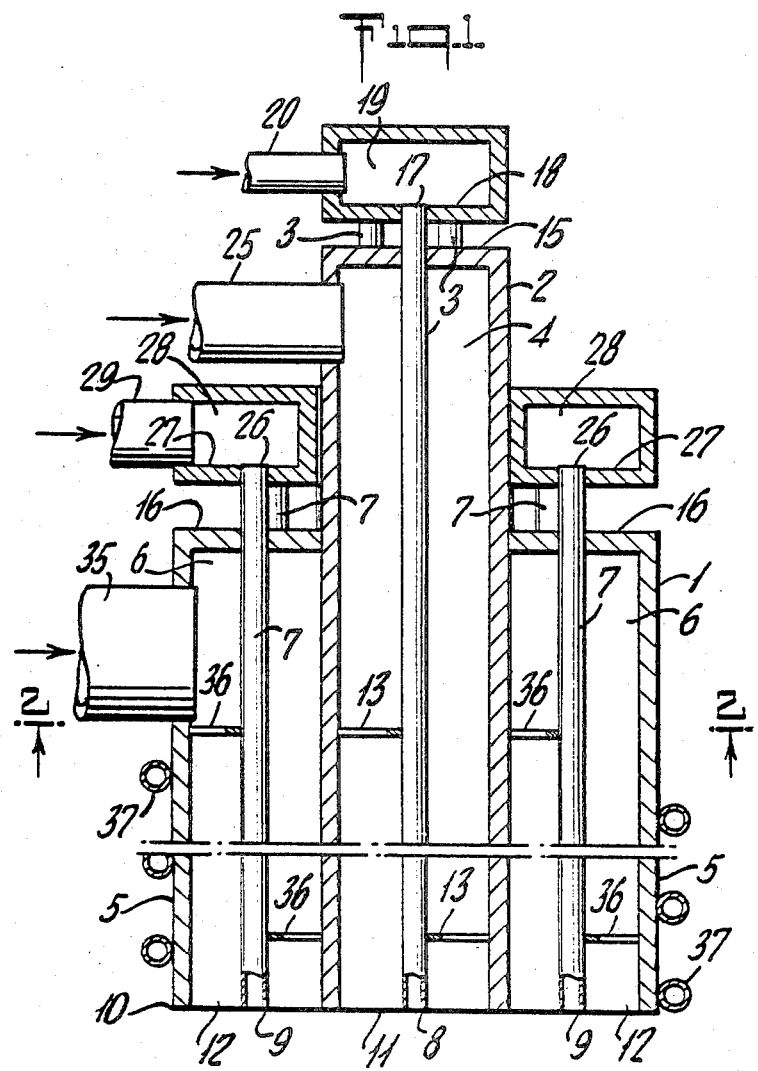
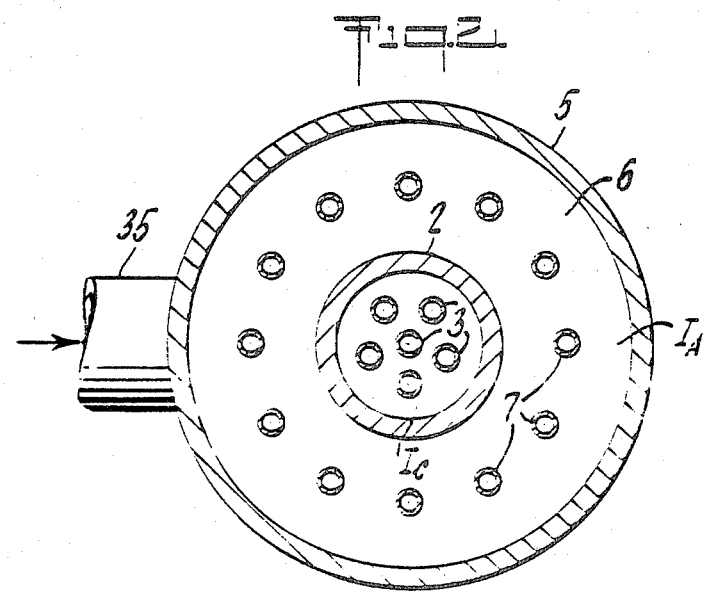

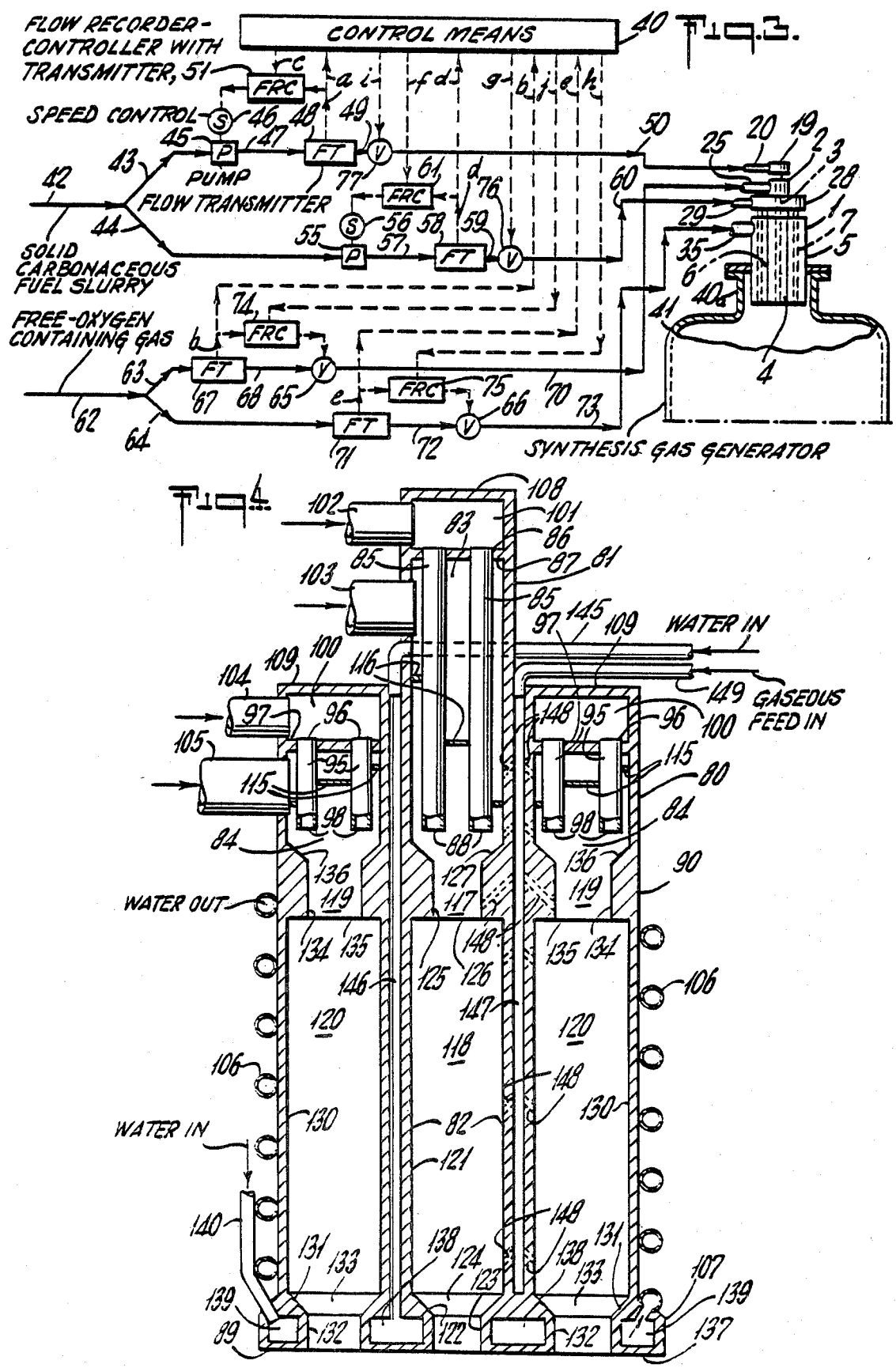

HIGH TURNDOWN PARTIAL OXIDATION PROCESS

This is a division of application Ser. No. 167,876 filed July 14, 1980 and which is now U.S. Pat. No. 4,351,645, which is a continuation-in-part of parent application Ser. No. 107,215, filed Dec. 26, 1979 and which is now U.S. Pat. No. 4,338,099.

BACKGROUND OF THE INVENTION

1. Field of the Invention

This invention relates to the manufacture of gaseous mixtures comprising $H_2$ and CO, e.g., synthesis gas, fuel gas, and reducing gas by the partial oxidation of pumpable slurries of solid carbonaceous fuels in a liquid carrier and/or liquid or gaseous hydrocarbon fuel. In one of its more specific aspects, the present invention relates to an improved burner for such gas manufacture.

2. Description of the Prior Art

Annulus-type burners have been employed for introducing liquid hydrocarbonaceous fuels into a partial oxidation gas generator. For example, coassigned U.S. Pat. No. 3,528,930 shows a single annulus burner, and coassigned U.S. Pat. Nos. 3,758,037 and 3,847,564 show double annulus burners. To obtain proper mixing, atomization, and stability of operation a burner is sized for a specific throughput. Should the required output of product gas change substantially, with prior-art burners, shut-down of the system is required in order to replace the prior-art burner with one of proper size. This problem is avoided and costly shut-downs are avoided by the subject burner which will operate at varying levels of output while retaining efficiency and stability. The more complex process for preheating a gas generator by means of a preheat burner, removing the preheat burner from the gasifier, and inserting a separate production burner is described in coassigned U.S. Pat. No. 4,113,445.

SUMMARY OF THE INVENTION

A burner and partial oxidation process for producing synthesis gas, fuel gas or reducing gas from slurries of solid carbonaceous fuel and/or liquid or gaseous hydrocarbon fuel is described. The burner has a high turndown feature and comprises: a central conduit that terminates in an unobstructed circular exit orifice at the burner face; a central bunch of parallel tubes that extend longitudinally through said central conduit and having downstream ends which are retracted upstream from the burner face a distance of about 0 to 12 times i.e. 3 to 10 times the minimum diameter of the central conduit exit orifice; and outer conduit coaxial with said central conduit and forming an annular passage therewith that terminates in an unobstructed annular orifice at the burner face; and an annular bunch of parallel tubes that extend longitudinally through said annular passage and having downstream ends which are retracted upstream from the burner face a distance of about 0 to 12 times i.e. 3 to 10 times the minimum width of the annular exit orifice.

Separate portions of the fuel feed may be passed through the central bunch of tubes and/or the annular bunch of tubes while simultaneously, the stream of free-oxygen containing gas is passed through the corresponding central conduit and/or the annular passage which respectively surrounds the bunch or bunches of tubes in use. Temperature moderators may be optionally in admixture with the gaseous oxidant and/or the fuel feedstreams. By this means the free-oxygen containing gas may be introduced into the interstices between the tubes and more efficient mixing of the reactant streams is achieved. Alternately, separate portions of the free-oxygen containing gas may be passed through the central and/or annular bunches of tubes while simultaneously the fuel feed is passed through the corresponding central conduit and/or annular passage which respectively surrounds the bunch or bunches of tubes in use.

In another embodiment of the burner, additional mixing of the reactant streams is obtained by providing one or more coaxial cylindrical shaped pre-mix chambers in series in the central conduit and/or one or more annular shaped pre-mix chambers in series in the annular passage. In the pre-mix chambers, the feedstreams to the reaction zone of a partial oxidation gas generator are mixed together without ignition and optionally preheated to vaporize from 0 to 100 volume percent of the liquid carrier. Jets of a gaseous material i.e. steam, free-oxygen containing gas, $CO_2$, $N_2$, recycle product gas, and mixtures thereof may be optionally introduced into at least one of the pre-mix chambers. The change in velocity of the mixture flowing through the successive pre-mix chambers assures a thorough mixing of the feedstreams prior to discharge from the burner. The multiphase mixture is passed, for example, through a converging exit orifice at the downstream end of the central conduit and/or annular passage at a discharge velocity which is greater than the flame propagating velocity.

Manual or automatic control means are described for adjusting the throughput levels of the fuel and oxidant streams through the subject burner—up or down—to produce many levels of gasifier output while retaining efficiency and stability.

Starting up the partial oxidation gas generator is simplified by a new procedure which employs the subject burner only. Separate preheat burners are thereby eliminated.

BRIEF DESCRIPTION OF THE DRAWING

In order to illustrate the invention in greater detail, reference is made to several embodiments involving burner constructions as shown in the figures of the drawing wherein FIG. 1 is a diagramatic vertical longitudinal schematic representation showing one embodiment of the burner;

FIG. 2 is a transverse section through line 2—2 of the embodiment of the burner shown in FIG. 1;

FIG. 3 is a schematic representation of one embodiment of the invention showing control means for rapidly changing throughput levels—up or down;

FIG. 4 is a vertical longitudinal schematic representation of one embodiment of the burner showing two central and annular pre-mix chambers in series and central and annular bunches of tubes with their ends retracted upstream from the face of the burner.

DESCRIPTION OF THE INVENTION

The present invention involves a novel burner and the process for the manufacture of gas mixtures comprising $H_2$, CO, $CO_2$ and at least one material selected from the group consisting of $H_2O$, $N_2$, A, $CH_4$, $H_2S$ and COS, such as synthesis gas, fuel gas, and reducing gas, by the partial oxidation of a reactant stream selected from the group consisting of a pumpable slurry of solid carbonaceous fuel in a liquid carrier, liquid or gaseous hydrocarbon fuel, and mixtures thereof with or without admixture with a temperature moderator, with a reactant stream of free-oxygen containing gas with or without admixture with a temperature moderator. The product gas mixture is produced in the reaction zone of a noncatalytic, refractory-lined, free-flow partial oxidation gas generator, such as described in coassigned U.S. Pat. No. 2,809,104 issued to Dale M. Strasser et al at a temperature in the range of about 1700° to 3500° F. and a pressure in the range of about 1 to 300 atmospheres, such as about 5 to 250 atmospheres, say about 10 to 100 atmospheres.

During operation of a partial oxidation gas generator, it may be necessary to rapidly turndown the production of the effluent gas to about $\frac{1}{8}$ to $\frac{3}{4}$ of the plant-design output, without replacing the burner. Changing the burner requires a costly shut-down period with resultant delay. Thus, in combined cycle operation for power generation a durable burner is required which offers minimum pressure drop and with which throughput levels may be rapidly changed—up and down—without sacrificing stable operation and efficiency. Further, the burner should operate with a variety of liquid, solid, and gaseous fuels, and mixtures thereof. These requirements have been fulfilled with the subject burner.

Combustion instability and poor efficiency can be encountered when prior art burners are used for the gasification of liquid phase slurries of solid carbonaceous fuels. Further, feedstreams may be poorly mixed and solid fuel particles may pass through the gasifier without contacting significant amounts of oxygen. Unreacted oxygen in the reaction zone may then react with the product gas.

These problems and others are avoided by the subject novel burner comprising: a central conduit, said central conduit being closed at the upstream end and having an unobstructed downstream circular exit orifice at the tip of the burner; an outer conduit coaxial and concentric with said central conduit along its length and in spaced relationship therewith and forming an annular passage therebetween, said annular passage being closed at the upstream end and having an unobstructed downstream annular exit orifice at the tip of the burner; a central bunch of tubes in symmetrical spaced relationship passing through the closed end of said central conduit and making a gastight seal therewith, the tubes of said central bunch of tubes being parallel to each other and to the burner axis and extending along said central conduit without touching each other and having upstream inlet means for introducing a first feedstream and downstream ends through which said first feedstream is discharged, and wherein the downstream ends of said central bunch of tubes are retracted upstream from the burner face a distance of about 0 to 12 times the minimum diameter of the central conduit exit orifice at the tip of the burner, means for spacing and supporting said central bunch of tubes with respect to the inside wall of said central conduit and to each other, and upstream inlet means for introducing a second feedstream into said central conduit and the interstices between the central bunch of parallel tubes; an annular bunch of tubes in symmetrical spaced relationship passing through the closed end of said annular passage and making a gastight seal therewith, the tubes in said annular bunch of tubes being parallel to each other and to the burner axis and extending along said annular passage without touching each other and having upstream inlet means for introducing a third feedstream into said tubes and downstream ends through which said third feedstream is discharged, and wherein the downstream ends of said annular bunch of tubes are retracted upstream from the burner face a distance of about 0 to 12 times the minimum width of the annular exit orifice at the tip of the burner, means for spacing and supporting said annular bunch of tubes with respect to the inside wall of said annular passage and to each other, and upstream inlet means for introducing a fourth feedstream into said annular passage and the interstices between the annular bunch of parallel tubes in said annular passage.

Preferably, said first and third feedstreams and said second and fourth feedstreams are respectively split streams from a fuel stream and a gaseous oxidant stream. In one embodiment, however, the first and fourth feedstreams, and the second and third feedstreams are respectively split streams from a fuel stream and a stream of gaseous oxidant.

Flow control means are provided herein for controlling the introduction of said four feedstreams into the burner. Briefly, manual or automatically controlled fluid-controller is placed in each feed line. For slurry fuel feed lines, a signal from the controller is transmitted to a speed control for a positive displacement pump. For liquid or gaseous hydrocarbon fuel feed lines and for oxidant feed lines, the signal from the controller is transmitted to a flow control valve. Responsive to said signal, the speed of said pump is varied, or alternately the opening in said flow control valve is changed. By this means, the ratio for the streams of fuel and/or oxidant passing through the burner may be adjusted up or down, say up to about 50% of the Design Conditions. Alternatively, a flow control valve may be inserted in each of the four feedstreams to start or stop the flow of the feedstreams to the central conduit and/or the annular passage and to their respective bundles of tubes. By this means, three ranges of flow through the burner may be obtained. Further, both of these flow control schemes may be combined.

By means of the subject burner a large volume of the first reactant stream is split into a plurality of separate streams of reactant fluid flowing through the central bunch of parallel tubes. This permits the introduction of the second stream of reactants passing concurrently through the central conduit into the interstices surrounding the central bunch of tubes. Similarly, a large volume of the third reactant stream is split into a plurality of separate streams of reactant fluid flowing through the annular bunch of parallel tubes. The fourth stream of reactants passing concurrently through the annular passage is introduced into the interstices surrounding the annular bunch of tubes. The greater the number of tubes in a bunch, the better the distribution of one reactant within the other reactant. The mixing of the reactant streams which takes place downstream of the ends of the tubes is facilitated by this improved distribution. Such efficient mixing of the feedstreams facilitates a more uniform partial oxidation of the fuel to produce $H_2$ and $CO$. The combustion efficiency of the process in thus increased.

By means of the subject invention, reactions are made to proceed in local regions where there is less opportunity for overheating the fuel with an insufficient supply of oxygen to result in the formation of soot. Thus, the amount of unconverted particulate carbon produced for a given oxygen to carbon atomic ratio in the feed may be substantially reduced. Further, "overburning" of the fuel to produce carbon dioxide is substantially reduced. It is recommended that the subject burner be made from heat and corrosion-resistant metal alloys.

The velocity of the reactant stream through the central and annular bunches of tubes, or alternatively through the central conduit or annular passage surrounding said tubes is in the range of about 5-100, say 10-50 feet per second at the face of the burner when said reactant stream is a liquid hydrocarbon fuel or liquid slurry of solid carbonaceous fuel, and in the range of about 150 feet per second to sonic velocity, say 200-500 feet per second when said reactant stream is a gaseous hydrocarbon fuel or a free-oxygen containing gas with or without admixture with a temperature moderator.

The central bunch of tubes may number in the range of about 2-200 or more, say about 6-36. The annular bunch of tubes may number in the range of about 4-600, or more, say about 12-108. There may be 1 to 7 or more concentric rings of tubes in each bunch.

The ratio of the total tube cross-sectional area (basis inside diameter) for the annular bunch of tubes ($T_A$) to the total tube cross-sectional area (basis inside diameter) for the central bunch of tubes ($T_C$) may be in the range of about 2-8. Similarly, the ratio of the annular interstitial cross-sectional area ($I_A$) surrounding the annular bunch of tubes to the central interstitial cross-sectional area ($I_C$) surrounding the central bunch of tubes may be in the range of about 2-8.

The inside diameter of the tubes in either bunch may range from about 1/16 to 2 inches in diameter. The length of the tubes in the central and annular bunches and their spacing are such as to permit the external reactant stream to flow evenly into the interstices between the tubes. For example, the length of the tubes in either tube bundle may range from about ½ to 24 inches or longer and preferably from about 4 to 10 inches, with greater lengths required as the number of tubes and the total size of the burner increases. Preferably, the ratio of the length to inside diameter of the tubes should be at least 8. Preferably, the inside diameter and the length of each tube should be the same for all tubes in the central bunch or the annular bunch. By this means equal flow may be obtained through all of the tubes.

Alignment pins, fins, centering vanes, spacers and other conventional means are used to symmetrically space the tubes and conduits with respect to each other and to hold same in stable alignment without obstructing the free-flow of the feedstreams in the central and annular interstitial zones.

The downstream exit ends of the plurality of annular and central bunches of tubes terminate in the same plane perpendicular to the longitudinal central axis of the burner. In one embodiment employing pre-mix chambers, to be further described, the ends of the central and/or annular bunch of tubes are retracted upstream from the burner face to provide substantial mixing of the reactants and volatilization of the slurry medium prior to discharge.

The central conduit exit orifice and/or the annular exit orifice may have converging sections. For example, the central conduit exit orifice may comprise a frusto-conical rear portion having a converging angle in the range of about 15° to 90° from the central longitudinal axis of the burner. The rear portion may develop into a normal cylindrical front portion which terminates at the downstream face of the burner. The cylindrical front portion may have a height in the range of about 0 to 1.5 times its own diameter. Similarly, said annular exit orifice may comprise a generated converging frusto-conical shaped annular rear portion having a converging angle in the range of about 15° to 90° from the central axis of the frusto-conical section, said central axis being parallel to the central longitudinal axis of the burner. The rear portion may develop into a generated normal cylindrical annular front portion which terminates at the downstream face of the burner. The cylindrical front portion may have a height in the range of about 0 to 1.5 times its own width.

In one embodiment, the central conduit exit orifice and/or the annular exit orifice are in the shape of or is generated by an American Society of Mechanical Engineer's standard long-radius nozzle. A further description of said nozzle may be found in "Thermodynamics Fluid Flow and Heat Transmission" by Huber O. Croft, page 155, First Edition, 1938 McGraw-Hill Book Company.

The burner may be cooled on the outside by means of cooling coils that encircle the outside barrel of the burner along its length. The downstream end of the burner may be provided with a cored face plate through which a coolant is circulated. For example, an annular cooling chamber may encircle the annular exit orifice and/or the central conduit exit orifice. The cooling chamber, central conduit exit orifice and/or the annular exit orifice may constitute a single piece of thermal and wear resistant material such as tungsten carbide or silicon carbide. Any suitable coolant may be employed e.g. water.

In one embodiment of the subject burner, a plurality of high pressure high velocity jet streams of a gaseous material is passed into the central conduit and/or annular passage at various locations along their length. By this means atomizing of the fuel feedstream and, optionally, mixing it with the oxidant stream may be facilitated. For example, the gaseous material may be passed through a plurality of small diameter passages or holes, i.e. about 0.032 to 0.50 diameter that lead into said central conduit and/or annular passage.

The gaseous material may be selected from the group consisting of steam, free-oxygen containing gas, $CO_2$, $N_2$, fuel gas, a recycle portion of the product gas, and mixtures thereof. The gaseous material may be introduced into the burner at a temperature in the range of about ambient to 1500° F. and a velocity in the range of about 100 feet per second to sonic velocity. The pressure of the gaseous material may be in the range of about 76 to 4500 psia and is greater than the pressure of the other feedstreams passing through the burner.

The discharge velocity for the material leaving through the central exit orifice is in the range of about 0.5 to 1.5 times, and preferably the same as, the discharge velocity of the material leaving through the annular exit orifice. The streams leaving the two exit orifices mix together and atomization may take place immediately downstream from the face of the burner.

In another embodiment of the invention, additional mixing of the reactant streams is effected in at least one, say 2 to 5 coaxial cylindrical shaped pre-mix chambers in series in the central conduit and/or at least one, say 2 to 5 annular shaped pre-mix chambers in series in the annular passage. In such case, the downstream ends of the central bunch of tubes are retracted upstream from the face of the burner a distance of about 3 to 10 times the minimum diameter of the circular exit orifice and/or the downstream ends of the annular bunch of tubes are retracted upstream from the face of the burner a distance of 3 to 10 times the minimum width of the annular exit orifice. Preferably, the downstream ends of the central and annular bunches of tubes are retracted upstream from the entrance to the first pre-mix chamber in the line. For example, the set back of the ends of the tubes from the entrance to the first pre-mix chamber may be in the range of about 0.1-2.0 times the diameter of the first pre-mix chamber.

In one embodiment, each of the pre-mix chambers in the central conduit except the first are cylindrical shaped and comprises a coaxial cylindrical body portion followed by a coaxial at least partially converging outlet portion. The first cylindrical-shaped pre-mix chamber in the central conduit comprises a normal coaxial cylindrical body portion that discharges directly into the next in line coaxial cylindrical shaped pre-mix chamber. Each pre-mix chamber in the annular conduit except the first is annular shaped and comprises a coaxial generated normal cylindrical annular body portion followed by a coaxial generated converging frustoconical shaped annular outlet portion. The first annular shaped pre-mix chamber comprises a coaxial generated normal cylindrical annular body portion that discharges directly into the next in line coaxial annular shaped pre-mix chamber. The converging outlet portions of said pre-mix chambers may be made from tungsten carbide or silicon carbide for increased wear resistance.

The size relationship between successive pre-mix chambers in the subject burners may be expressed in the following manner: For burners in which the pre-mix chambers in the central conduit are successively numbered 1 to 5 and/or the pre-mix chambers in the annular passage are numbered 6-10, then the ratio of the diameter of any one of said central chambers to the diameter of the next central chamber in the line i.e. $D_1:D_2$; $D_2:D_3$; $D_3:D_4$; or $D_4:D_5$ may be in the range of about 0.2-1.2. The ratio of the length of any one central pre-mix chamber in said central conduit to the length of the next central pre-mix chamber in the line i.e. $L_1:L_2$; $L_2:L_3$; $L_3:L_4$; or $L_4:L_5$ may be in the range of about 0.1-1.0. The ratio of the annular width of any one of said annular pre-mix chambers to the width of the next annular chamber in the line i.e. $W_6:W_7$; $W_7:W_8$; $W_8:W_9$; or $W_9:W_{10}$ may be in the range of about 0.1-1.2. The ratio of the length of any one annular pre-mix chamber in said annular passage to the length of the next annular pre-mix chamber in the line, i.e. $L_6:L_7$; $L_7:L_8$; $L_8:L_9$; or $L_9:L_{10}$ may be in the range of about 0.1-1.0.

In most other respects the design of this pre-mix embodiment of the burner, including the tubes, passages, orifices, water-cooled face-plate and cooling coils, high pressure high velocity jets of a gaseous material entering said central and/or annular pre-mix chambers, and flow control means are substantially the same as previously described. Further, the temperature, pressure and velocity ranges for the streams of materials passing through the various passages of the burner are substantially the same as those discussed previously.

In the operation of the embodiment of the burner employing pre-mix chambers flow control means may be used to control the flow of the four feedstreams to the tubes and passages in the burner in the same manner as described previously. The feedstreams entering the burner and simultaneously and concurrently passing through at different velocities impinge and mix with each other in the first pre-mix chambers. The impingement of one reactant stream, such as the liquid slurry of solid carbonaceous fuel in a liquid medium optionally in admixture with a temperature moderator, with another reactant stream, such as a gaseous stream of free-oxygen containing gas optionally in admixture with a temperature moderator at a higher velocity, causes the liquid slurry to break up into a fine spray. The multiphase mixture produced then successively passes through any remaining pre-mix chambers where additional mixing takes place. As the mixture passes freely through the subject unobstructed burner its velocity changes many times. For example, at various points in the burner the velocity of the mixture may range from about 20 to 600 ft. per sec. As the mixture flows from one pre-mix chamber to the next, the velocity changes are mainly the result of changes in the diameter of the flow path and the quantity and temperature of the mixture. This promotes a thorough mixing of the components. By operating in the region of turbulent flow, mixing may be maximized. Further, direct heat exchange between the materials takes place within the burner. From 0-100 vol. %, say about 5-25 vol. % of the liquids in the feedstreams may be vaporized before the feedstreams leave the burner. By means of converging exit orifices, the feedstreams may be accelerated directly into the reaction zone of the partial oxidation gasifier.

Burning of the combustible materials while passing through the pre-mix zone of the burner may be prevented by discharging the multiphase mixtures at the central and annular exit orifices at the tip of the burner with a discharge velocity which is greater than the flame propagation velocity. Flame speeds are a function of such factors as composition of the mixture, temperature and pressure. They may be calculated by conventional methods or determined experimentally. The ratio of the discharge velocity for the multiphase mixture being discharged through the central exit orifice to the multiphase mixture being discharged through the annular exit orifice may be in the range of about 0.5 to 1.5, such as 1.0.

Depending on such factors as the temperature, velocity, dwell time and composition of the feedstreams; the desired amount of vaporization of liquid carrier; the temperature and amount of recycle gases in the generator; and the desired life of the burner; cooling coils may or may not encircle the outside barrel of the burner along its length. For similar reasons, the burner may or may not be provided with an annular shaped cooling chamber at the downstream end.

The multiphase mixtures simultaneously departing from the central orifice and/or the annular orifice at the downstream tip of the burner mix together downstream from the face of the burner.

Advantageously, by means of the subject burner, the exothermic partial oxidation reactions take place a sufficient distance downstream from the burner face so as to protect the burner from thermal damage.

Liquid hydrocarbon fuels and/or pumpable slurries of solid carbonaceous fuels having a dry solids content in the range of about 30 to 75 wt. %, say about 40 to 70 wt. % may be passed through the inlet passages of the subject burner. For example, the fuel streams may be passed through the central and/or annular bunch of tubes. The inlet temperature of the liquid hydrocarbon fuel or the slurry is in the range of about ambient to 500° F., but preferably below the vaporization temperature of the liquid hydrocarbon at the given inlet pressure in the range of about 1 to 300 atmospheres, such as 5 to 250 atmospheres, say about 10 to 100 atmospheres.

The term solid carbonaceous fuels, as used herein to describe suitable solid carbonaceous feedstocks, is intended to include various materials and mixtures thereof from the group consisting of coal, coke from coal, char from coal, coal liquefaction residues, petroleum coke, particulate carbon soot, and solids derived from oil shale, tar sands, and pitch. All types of coal may be used including anthracite, bituminous, sub-bituminous, and lignite. The particulate carbon may be that which is obtained as a by-product of the subject partial oxidation process, or that which is obtained by burning fossil fuels. The term solid carbonaceous fuel also includes by definition bits of garbage, dewatered sanitary sewage, and semi-solid organic materials such as asphalt, rubber and rubber-like materials including rubber automobile tires which may be ground or pulverized to the aforesaid particle size. Any suitable grinding system may be used to convert the solid carbonaceous fuels or mixtures thereof to the proper size.

The solid carbonaceous fuels are preferably ground to a particle size so that 100% of the material passes through an ASTM E 11-70 Sieve Designation Standard 1.4 mm (Alternative No. 14) and at least 80% passes through an ASTM E 11-70 Sieve Designation Standard 425 $\mu$m (Alternative No. 40).

The moisture content of the solid carbonaceous fuel particles is in the range of about 0 to 40 wt. %, such as 2 to 20 wt. %.

The term free-oxygen containing gas, as used herein is intended to include air, oxygen-enriched air, i.e., greater than 21 mole % oxygen, and substantially pure oxygen, i.e., greater than 95 mole % oxygen, (the remainder comprising $N_2$ and rare gases).

Simultaneously, a stream of free-oxygen containing gas is supplied to the reaction zone of the gas generator by way of a free passage in the burner, such as through the central conduit and/or annular passage at a temperature in the range of about ambient to 1500° F., and preferably in the range of about ambient to 300° F., for oxygen-enriched air, and about 500° to 1200° F., for air, and a pressure in the range of above about 1 to 300 atmospheres, such as 5 to 250 atmospheres, say 10 to 100 atmospheres. The atoms of free-oxygen plus atoms of organically combined oxygen in the solid carbonaceous fuel per atom of carbon in the solid carbonaceous fuel (O/C atomic ratio) may be in the range of 0.5 to 1.95. With free-oxygen containing gas in the reaction zone the broad range of said O/C atomic ratio may be about 0.5 to 1.7, such as about 0.7 to 1.4. More specifically, with air feed to the reaction zone, said O/C atomic ratio may be about 0.7 to 1.6, such as about 0.9 to 1.4.

The term temperature moderator as employed herein includes water, steam, $CO_2$, $N_2$, and a recycle portion of the product gas stream. The temperature moderator may be in admixture with the fuel stream and/or the oxidant stream.

For example in one embodiment, the feedstream comprises a slurry of liquid hydrocarbonaceous material and solid carbonaceous fuel. $H_2O$ in liquid phase may be mixed with the liquid hydrocarbonaceous carrier, for example as an emulsion. A portion of the $H_2O$ i.e., about 0 to 25 weight % of the total amount of $H_2O$ present may be introduced as steam in admixture with the free-oxygen containing gas. The weight ratio of $H_2O$/fuel may be in the range of about 0 to 5, say about 0.1 to 3.

The term liquid carrier, as used herein as the suspending medium to produce pumpable slurries of solid carbonaceous fuels is intended to include various materials from the group consisting of water, liquid hydrocarbonaceous material, and mixtures thereof. However, water is the preferred carrier for the particles of solid carbonaceous fuel. In one embodiment, the liquid carrier is liquid carbon dioxide. In such case, the liquid slurry may comprise 40–70 wt. % of solid carbonaceous fuel and the remainder is liquid $CO_2$. The $CO_2$-solid fuel slurry may be introduced into the burner at a temperature in the range of about $-67°$ F. to 100° F. depending on the pressure.

The term liquid hydrocarbonaceous material as used herein to describe suitable liquid carriers, is intended to include various materials, such as liquified petroleum gas, petroleum distillates and residues, gasoline, naphtha, kerosine, crude petroleum, asphalt, gas oil, residual oil, tar sand oil and shale oil, coal derived oil, aromatic hydrocarbon (such as benzene toluene, xylene fractions), coal tar, cycle gas oil from fluid-catalytic-cracking operation, furfural extract of coker gas oil, methanol, ethanol and other alcohols and by-product oxygen containing liquid hydrocarbons from oxo or oxyl synthesis, and mixtures thereof.

The subject burners as shown in FIGS. 1-4 may be operated with the feedstreams passing through alternate passages in the burner. Typical modes of operation are summarized in Tables I and II below.

Table I lists the materials being introduced into the gasifier by way of the burner and their corresponding symbol. The solid carbonaceous fuel (B), water (C), and liquid hydrocarbonaceous material (E) may be mixed together in various combinations upstream from the burner inlet to produce a pumpable slurry which may be introduced into the burner and then passed through one of the several free-flow passages of the burner as shown in Table II. For example, the first entry in Table II shows that a pumpable slurry stream comprising solid carbonaceous fuel (B) in admixture with water (C) may be passed through the central and/or annular bunch of tubes in the burner i.e. FIG. 1 or 4. Whenever a fuel stream is introduced into the burner, a corresponding upstream of free-oxygen containing gas is simultaneously passed through the related central conduit and/or annular passage. Some additional examples follow:

(1) separate streams of free-oxygen containing gas are passed through said central and/or annular bunches of tubes; and simultaneously separate corresponding streams of a pumpable slurry of solid carbonaceous fuel in a liquid carrier are passed through the related central conduit, and/or annular passage.

(2) separate streams of free-oxygen containing gas are passed through said central conduit and said annular passage; while simultaneously a corresponding stream of liquid hydrocarbonaceous material is passed through the related central and/or annular bunches of tubes; and simultaneously a pumpable slurry of solid carbonaceous fuel in a liquid carrier is passed through the free bunch of said tubes, if any.

(3) separate streams of free-oxygen containing gas are passed through said central and/or annular bunches of tubes; while simultaneously a corresponding stream of liquid hydrocarbonaceous material is passed through the related central conduit and/or annular passage; and simultaneously a pumpable slurry of solid carbonaceous fuel in a liquid carrier is passed through the free passage, if any.

TABLE I

| Material | Symbol |
| --- | --- |
| Free-oxygen Containing Gas | A |
| Solid Carbonaceous Fuel | B |
| Water | C |
| Steam | D |
| Liquid Hydrocarbonaceous Material | E |
| Temperature Moderating Gas | F |
| Gaseous Hydrocarbon Fuel | G |

TABLE II

| Central Conduit | Central Bunch of Tubes | Annular Passage | Annular Bunch of Tubes |
| --- | --- | --- | --- |
| A | B + C | A | B + C |
| A + D | B + C | A + D | B + C |
| B + C | A | B + C | A |
| A | B + C | B + C | A |
| B + C | A | A | B + C |
| A | B + C + E | A | B + C + E |
| B + C + E | A + D | B + C + E | A + D |
| A | E | A | E |
| A + D | B + E | A + D | B + E |
| B + E | A + D | B + E | A + D |
| A + D | E | A | B + C |
| E | A | E | A |
| B + C | A | E | A |
| E | A | B + C | A |
| A | G | A | B + C |
| A | G | A + D | E |
| A | E + F | A | E + F |
| E + F | A + D | E + F | A + D |

Other modes of operation of the subject invention are possible in addition to those shown in Table II.

For example, jet streams of a gaseous material may be simultaneously introduced into the central conduit and/or annular passage, as previously described.

When one of the fuel streams is a liquid hydrocarbon or the liquid carrier for the slurry of solid carbonaceous fuel is a liquid hydrocarbonaceous material premature combustion within the burner may be avoided by one or more of the following:

(1) keeping the fuel below its autoignition temperature,
(2) including water in the solid fuel slurry,
(3) using air or air enriched with oxygen i.e. up to about 40 vol. % $O_2$,
(4) mixing steam with the air,
(5) employing about 0 retraction of the ends of the central and annular bunches of tubes from the face of the burner. In such case, the free-oxygen containing gas such as substantially pure oxygen may be separately discharged from the burner without first contacting the fuel stream.
(6) discharging the multiphase mixture at the central and annular exit orifices at the tip of the burner with discharge velocities that exceed the flame propagation velocity.

The subject burner assembly is inserted downward through a top inlet port of a compact unpacked free-flow noncatalytic refractory lined synthesis gas generator, for example as shown in coassigned U.S. Pat. No. 3,544,291. The burner extends along the central longitudinal axis of the gas generator with the downstream end discharging directly into the reaction zone.

The relative proportions of the reactant feedstreams and optionally temperature moderator that are introduced into the gas generator are carefully regulated to convert a substantial portion of the carbon in the fuel e.g., up to about 90% or more by weight, to carbon oxides; and to maintain an autogenous reaction zone temperature in the range of about 1700° to 3500° F., preferably in the range of 2000° to 2800° F.

The dwell time in the reaction zone is in the range of about 1 to 10 seconds, and preferably in the range of about 2 to 8. With substantially pure oxygen feed to the gas generator, the composition of the effluent gas from the gas generator in mole % dry basis may be as follows: $H_2$ 10 to 60, CO 20 to 60, $CO_2$ 5 to 40, $CH_4$ 0.01 to 5, $H_2S$+COS nil to 5, $N_2$ nil to 5, and A nil to 1.5. With air feed to the gas generator, the composition of the generator effluent gas in mole % dry basis may be about as follows: $H_2$ 2 to 30, CO 5 to 35, $CO_2$ 5 to 25, $CH_4$ nil to 2, $H_2S$+COS nil to 3, $N_2$ 45 to 80, and A 0.5 to 1.5. Unconverted carbon and ash are contained in the effluent gas stream.

The hot gaseous effluent stream from the reaction zone of the synthesis gas generator is quickly cooled below the reaction temperature to a temperature in the range of about 250° to 700° F. by direct quenching in water, or by indirect heat exchange for example with water to produce steam in a gas cooler.

Advantageously, in another embodiment of the subject invention the subject burner may be used as the preheat burner during start-up of the gasifier, as well as the production burner. Start-up procedures are thereby simplified. Previously, time was lost when the gas preheat burner was replaced by the production burner, and the gasifier cooled down. Now the gasifier may be brought up to operating temperature and held there by simultaneously passing fuel gas through the central or annular bunch of tubes and air through the related central conduit or annular passage. Alternately, the fuel gas may be passed through the central conduit or annular passage in the burner and the air is passed through the related central or annular bunch of tubes. The fuel gas and air are mixed together to produce a well-distributed blend. Burning of the mixture by substantially complete combustion then takes place in the reaction zone of the gas generator at an absolute pressure in the range of about 0.56 to 300 atmospheres, and preferably at 1 atmosphere. The products of the complete combustion are removed from the reaction zone. For example, they may be vented to the atmosphere. By this means, the reaction zone is heated to the temperature required for ignition of the autothermal partial oxidation reaction of the principal fuel selected from the group consisting of a pumpable slurry of solid carbonaceous fuel, liquid or gaseous hydrocarbon fuel, and mixtures thereof with a free-oxygen containing gas and with or without a temperature moderator. For example, the autoignition temperature may be in the range of about 2000° to 2700° F. At this point, the principal fuel, with or without admixture with a temperature moderator, is passed through either the central or annular bunch of tubes, or alternately the central conduit or annular passage, whichever is occupied by the fuel gas and air. Simultaneously, a stream of free-oxygen containing gas, with or without admixture with a temperature moderator, is passed through either the central conduit or annular passage of the burner, or alternately through either the central or annular bunch of tubes which ever is associated with the bunch of tubes or alternately with the conduit or passage through which the principal fuel is flowing.

The stream of principal fuel and free-oxygen containing gas are mixed together to produce a well-distributed blend. The mixture ignites by autoignition and burns by partial oxidation downstream in the reaction zone of the free-flow noncatalytic gas generator at an autogenous temperature in the range of about 1700° to 3500° F., a pressure in the range of about 1 to 300 atmospheres, an atomic ratio of oxygen carbon in the range of about 0.5 to 1.7 and $H_2O$/fuel weight ratio in the range of about 0 to 5.0, such as 0.1 to 3.

At the moment that the partial oxidation of the principal fuel commences, the fuel gas and related air supply may or may not be cut off. For example, the fuel gas and related supply of oxidant may be continued at the same flow rate or at a reduced flow rate i.e. about $\frac{1}{8}$ to $\frac{3}{4}$ of the maximum flow rate. Further, if the supply of the fuel gas to the burner is continued, then the flow rate of the fuel gas stream and the associated stream of oxidant is adjusted to provide an atomic O/C ratio in the range of 0.5 to 1.7 and the partial oxidation of the fuel gas rather than complete combustion. Optionally, depending on the desired composition of the product gas, the air may be replaced by another free-oxygen containing gas. For example, oxygen enriched air or substantially pure oxygen is preferred to make synthesis gas.

In another embodiment, the stream of fuel gas in the burner is replaced by an alternate fuel stream selected from the group consisting of a pumpable slurry of solid carbonaceous fuel in a liquid carrier i.e. water, hydrocarbon, oxygenated hydrocarbon, liquid or gaseous hydrocarbon fuel, and mixtures thereof. Similarly, the air stream may be replaced with a stream of free-oxygen containing gas other than air. The reactant streams are mixed together to produce a well-distributed blend in the proper proportions for reacting said alternate fuel by partial oxidation. After autoignition, said mixture is burned by partial oxidation downstream in the reaction zone of the gas generator simultaneously with the partial oxidation of the principal fuel and at the same operating conditions. The alternate fuel and the associated free-oxygen containing gas streams may be passed through the same or alternate passages in the burner as previously occupied respectively by the fuel gas stream and the associated air stream.

A raw stream of synthesis gas, fuel gas, or reducing gas (depending on the composition of the product gas) is produced and removed from the reaction zone. The hot raw gas stream may be then cooled, cleaned and purified by conventional methods.

In one embodiment, the aforesaid fuel gas in the preheat stage may be replaced by a liquid hydrocarbon fuel. A free-oxygen containing gas may be employed as the oxidant.

DESCRIPTION OF THE DRAWING

Referring to FIGS. 1–4, a-, to provide a brief description of the drawing figures.

A more complete understanding of the invention may be had by reference to the accompanying schematic drawings which show the subject invention in detail. Although the drawings illustrate preferred embodiments of the invention, it is not intended to limit the subject invention to the particular apparatus or materials described. Corresponding parts in the several figures have the same reference numbers.

Referring to FIG. 1, a high turndown burner assembly is depicted. Burner 1 is installed downwardly through a port in the top of a free-flow partial oxidation synthesis gas generator as shown in FIG. 3. The longitudinal central axis of burner 1 is preferably aligned along the central axis of the synthesis gas generator by means of a mounting flange. Burner 1 comprises central conduit 2, central bunch of parallel tubes 3 that pass longitudinally through central passage 4 of central conduit 2, coaxial concentric outer conduit 5, annular passage 6 between the outside diameter of central conduit 2 and the inside diameter of outer conduit 5 along its length and annular bunch of parallel tubes 7 that pass longitudinally through annular passage 6. Conduit 2 is a cylindrical wall that separates central passage 4 and annular passage 6. The downstream ends 8 of the central bunch of tubes 3, and the downstream ends 9 of annular bunch of tubes 7 terminate in an imaginary plane perpendicular to the central axis of the burner at the downstream face 10. In another embodiment, the downstream ends of the central bunch of tubes and/or the annular bunch of tubes are retracted upstream from burner face 10. Central circular orifice 11 and annular orifice 12 are determined by said imaginary plane perpendicular to the central axis of the burner at face 10. Central orifice 11 has a diameter equal to the minimum inside diameter of central conduit 2 or nozzle if any at face 10. The width of annular orifice 12 is equal to the minimum inside diameter of outer conduit 5 or nozzle if any less the maximum outside diameter of central conduit 2 or nozzle if any at face 10.

Wall brackets or tube spacers 13 hold tubes 3 in a fixed parallel nontouching position with respect to each other and the inside wall of central conduit 2.

Central bunch of tubes 3 are passed through and sealed into disc shaped fixed tube sheet 15. Tube sheet 15 closes off the upstream end of central conduit 2. Similarly, annular bunch of tubes 7 are passed through and sealed into annular shaped fixed tube sheet 16. Tube sheet 16 closes off the upstream end of outer conduit 5 and annular passage 6. Conventional means i.e. welding, turning, crimping, threading, rolling may be employed to provide an gas-tight seal or joint where the central and annular tubes penetrate the respective tube sheets. Mechanical pressure fittings and coupling devices may be also employed.

The upstream ends 17 of the central bunch of tubes 3 are connected to outlet means 18 of central cylindrical shaped manifold 19. Inlet feed pipe 20 is connected to and in communication with manifold 19. By this means, for example, a portion of a first reactant feedstream in feed pipe 20 may be introduced into central manifold 19, split into a plurality of streams which pass through outlet means 18 and the individual tubes in the central bundle 3, and are then discharged at the face 10 of the burner. Simultaneously, for example, a portion of a second reactant feedstream may be passed through inlet pipe 25. Pipe 25 is connected to and in communication with central conduit 2 near its upper end and below tube sheet 15. By this means, the portion of said second feedstream may fill the interstices between and surrounding all of the tubes in the central bunch 3 as it freely flows down through said central conduit 2 and is discharged through central orifice 11 at the face 10 of the burner.

The upstream ends 26 of the annular bunch of tubes 7 are connected to outlet means 27 of annular-shaped manifold 28. At least one inlet pipe 29 is connected to annular manifold 28. By this means, for example, the remaining portion of said first reactant feedstream may be introduced into annular manifold 28, split into a plurality of streams which pass through outlet means 27 and the individual tubes in the annular bundle 7, and then discharged at the face 10 of the burner. Simultaneously, for example, the remaining portion of said second reactant feedstream may be passed through inlet pipe 35. Pipe 35 is connected to and in communication with annular conduit 6 near its upper end and below tube sheet 16. By this means, the remaining portion of said second reactant stream may fill the interstices between and surrounding all of the tubes in the annular bunch 7 as it freely flows down through said annular passage 6 and is discharged through annular orifice 12 at face 10 of the burner. Ignition of the multiphase mixtures of first and second reactant feedstreams takes place downstream from the face of the burner.

Wall brackets or tube spacers 36 hold tubes 7 in a fixed parallel nontouching position with respect to each other and the inside wall of outer conduit 5 and the outside wall of central conduit 2. Central conduit 2 and outer conduit 5 may be radially spaced by similar means and by tube sheet 16.

Cooling coils 37 through which a coolant flows encircle the outside downstream end of outer conduit 5.

In another embodiment, a cored water cooled faceplate including converging nozzles terminating central conduit 4 and annular passage 6 comprises the front portion at the extreme tip of the burner, in the manner to be shown and further described for cored faceplate 107 in FIG. 4 of the drawing.

FIG. 2 is a transverse section through line 2—2 of the embodiment of the burner shown in FIG. 1. In FIG. 2, central bunch of tubes 3, are enclosed by central conduit 2. The central interstitial cross-sectional area (Ic) surrounding a suitable layout of 6 parallel tubes in the bundle of tubes 3 is depicted. The reactant feedstream passing longitudinally down through the central passage passes freely through the interstitial area surrounding the central bunch of evenly spaced tubes 3. Thus, there is provided thorough intermixing at the face of the burner of the feedstreams passing through the central bunch of tubes and the central interstitial area for the central conduit. The annular bunch of tubes 7 in FIG. 2 is represented by 12 parallel tubes in a single ring. There may be one to seven concentric coaxial radially spaced rings of tubes in annular passage 6 and also in the central passage 4. The inside diameter of all tubes are preferably equal. The reactant feedstream passing longitudinally down through annular passage 6 freely flows into the annular interstitial cross-sectional area ($I_A$) surrounding the evenly spaced annular bunch of tubes 7. Thus, there is provided thorough intermixing at the face of the burner 10 of the reactant streams freely flowing through the annular bunch of tubes 7 and the annular interstitial cross-sectional area surrounding the annular bunch of tubes.

FIG. 3 is a schematic representation of one embodiment of the invention showing control means for rapidly changing throughout levels of the four feedstreams to the burner shown in FIG. 1—up or down over the flow range of which the burner is designed in order to adjust for a change in demand for the product gas. Further, another use for the control system is to maintain the desired composition of the product gas by adjustments to the flow rates of one or both reactants.

By the subject flow control system, the flow rates for all four of the reactant streams are separately controlled so that the atomic ratio of oxygen to carbon in the reaction zone is maintained within a desired range, and a specified amount of raw effluent gas is produced.

While the control system shown in FIG. 3 is specifically designed for a solic carbonaceous fuel slurry, by simple modifications to the means for changing the flow rate of the fuel stream it may also control liquid and gaseous hydrocarbon fuels. These modifications are described below.

Burner 1, as previously described in FIGS. 1 and 2, is mounted in central flanged inlet 40a located in the upper head of conventional refractory lined free-flow synthesis gas generator 41 along the central longitudinal axis. Burner 1 is designed so that the required system output for steady-state operation may be achieved or even exceeded by a specified amount when the flow rate through all passages in both sections of the two-section burner is a maximum. The control system can change the flow rate of from one to four of the reactant streams as required. At the same time the ratio of oxidant to fuel in both sections of the burner is kept constant.

The metered feedstream of solid carbonaceous fuel slurry i.e. coal-water slurry in line 42 is split into two feedstreams 43 and 44 by separate flow control means in each line. The weight or volumetric area of flow for the slurry flowing through each of the feedlines to the burner is a function of the burner design. For example, the burner passages may be sized so that one-third of the total quantity of solid carbonaceous fuel slurry flowing through line 42 may be discharged through central bunch of tubes 3 in the specified velocity range. Simultaneously, the remaining two-thirds of the total quantity of solid carbonaceous fuel slurry is discharged through annular bunch of tubes 7 in the specified velocity range. Valves 76 and 77 are normally open but they may be manually or automatically operated so completely close off the stream flowing through one or both of the valves. This may be done, for example, in another embodiment to be further described, when it is desired to turn down the burner by operating the burner either in the central section i.e. central tubes 3 and annular passage 4 or in the outer annular section i.e. annular tubes 7 and annular passage 6.

The portion of the slurry feedstream in line 43 is pumped into the reaction zone of synthesis gas generator 41 by way of positive displacement pump 45 equipped with speed control 46, line 47, flow measurer and transmitter 48, line 49, normally open valve 77, line 50, inlet 20 of burner 1, central manifold 19, and central bunch of tubes 3.

The slurry flow rate through line 43 is controlled by the speed of positive displacement pump 45. The rate of slurry flow is measured and a signal a is provided by flow transmitter 48 corresponding to the flow rate of the slurry in line 43. Flow recorder-control 51 receives signal a and provides a signal to speed control 46 to adjust up or down the speed of pump 45, if necessary so that the charge slurry flow rate assumes a given value or set point. By this means, the adjustment to the rate of flow may be made, for example, up to 50% of the maximum flow rate for which the burner was originally designed. The set point flow rate in each case may be determined by conventional calculations based on heat and weight balances for the entire system. Alternately, the parameters for said calculations may be measured by conventional detectors and the signals responsive thereto including signal a, for example, may be fed to an overall control means or computer 40. The computer calculated value or the manually inserted set point for the desired slurry rate of flow is compared with signal a and responsive thereto signal c is provided for adjusting the speed of pump 45. Signal c may be fed directly to speed control 46, or indirectly by way of flow recorder-controller 51. Alternately, flow record-controller 51 may receive signal a from flow transmitter 48 and signal c from control means 40 and compute the speed adjustment signal for the operation of speed control 46.

Simultaneously, the remainder of the slurry feedstream in line 44 is pumped into the reaction zone of synthesis gas generator 41 by way of positive displacement pump 55 equipped in the speed control 56, line 57, flow measurer and transmitter 58, line 59, normally open valve 76, line 60, inlet 29 of burner 1, annular manifold 28, and annular bunch of tubes 7.

The slurry flow rate through line 44 is controlled by the speed of positive displacement pump 55. The rate of slurry flow is measured and a signal d is provided by flow transmitter 58 corresponding to the flow rate of the slurry in line 44. Flow recorder-controller 61 receives signal d and provides a signal to speed control 56 to adjust up or down the speed of pump 55, if necessary, so that the charge slurry flow rate assumes a given value or set point. By this means, the adjustment to the rate of flow may be made, for example, up to 50% of the maximum flow rate for which the burner was originally designed. Alternately, control of the slurry flow rate in line 44 may be effected by sending signal d to control means 40. Signal f from control means 40 is sent to flow-recorder-controller 61 or directly to speed control 56 for controlling the speed of pump 55 in the manner described previously for controlling the flow rate for the slurry in line 43.

Simultaneously, the proper amount of free-oxygen containing gas in line 62 for the partial oxidation of the related amount of solid carbonaceous fuel slurry flowing in line 42, is split into two streams 63 and 64 by flow control means in each line. The flow rate for the free-oxygen containing gas flowing through each of the feed lines to the burner is a function of the burner design. For example, the burner passages may be sized so that one-third of the total quantity of free-oxygen gas flowing through line 62 may be discharged through annular passage 4 at the specified velocity range. Valves 65 and 66 may be manually or automatically operated to respectively adjust the flow rate in lines 63 and 64. For example, an adjustment of up to 50% of the maximum flow rate for which the burner was originally designed for may be made.

Simultaneously, the remaining two-thirds of the total quantity of free-oxygen containing gas is discharged through annular passage 6 of the second section of the burner in the specified velocity range. Valves 65 and 66 are normally open but they may be manually or automatically operated to partially close off the stream flowing through one or both of the valves. In the embodiment to be further described, the burner may be operated in either the central section or in the outer section by completely closing respectively valve 66 or 65, while keeping the other valve open or partially closed. Valves 65 and 66 are normally operated simultaneously so that the change in the quantity of flow through lines 63 and 64 is the same. Simultaneously, adjustments to speed controls 46 and 56 are made to effect a corresponding change in the slurry flow rate through lines 43 and 44. By this means, the O/C atomic ratio in the reaction zone is maintained at the given value.

The portion of the free-oxygen containing gas stream in line 63 is introduced into the reaction zone of the synthesis gas generator 41 by way of flow transmitter 67, line 68, normally open valve 65, line 70, and inlet 25 to central passage 4 of burner 1. The rate of flow for the free-oxygen containing gas through line 63 is controlled by valve 65. The rate of flow for the free-oxygen containing gas is measured and a signal b is provided by flow transmitter 67 corresponding to the flow rate for the free-oxygen containing gas in line 63. Flow recorder-controller 74 receives signal b and provides a signal to valve 65 to adjust up or down, the rate of flow, if necessary, so that the free-oxygen containing gas flow rate assumes a given value or set point. By this means, the adjustment to the rate of flow may be made, for example, up to 50% of the maximum flow rate for which the burner was originally designed. Conventional or computerized calculations based on heat and weight balances for the system may be made to determine the set point, as previously described.

Simultaneously, the remainder of the free-oxygen containing gas feedstream in line 64 is introduced into the reaction zone of synthesis gas generator 41 by way of flow transmitter 71, line 72, normally open valve 66, line 73, and inlet 35 to annular passage 6 of burner 1. The rate of flow for the free-oxygen containing gas through line 64 is controller by valve 66. The rate of flow for the free-oxygen containing gas is measured and a signal e is provided by flow transmitter 71 corresponding to the flow rate for the free-oxygen containing gas in line 64. Flow recorder-controller 75 receives signal e and provides a signal to valve 66 to adjust up or down, the rate of flow, if necessary, so that the free-oxygen containing gas flow rate assumes a given value or set point. By this means, the adjustment to the rate of flow may be made, for example, up to 50% of the maximum flow rate for which the burner was originally designed.

Alternately, control means 40 may be employed to control the rate of flow of one or both streams of free-oxygen containing gas. Thus, signal b from flow transmitter 67 and/or signal e from flow transmitter 71 are compared in control means 40 with the computer calculated value or the set point. Responsive thereto signal j and/or h are respectively provided for partially opening or closing valve 65 and/or valve 66. Alternately, flow recorder-controller 74 and/or 75 may receive respectively signals j and h and/or signals b and e and compute the flow rate adjustment signal for the operation of valve 65 and/or 66.

In normal operation, all of the valves in the system are open so that the flow through the burner is about that of Design Conditions. A turndown of 50% of Design Conditions for burner 1 is achieved, for example, by simultaneously decreasing the speed of pumps 45 and 55 and partially closing valves 65 and 66 so as to reduce by about 50% the respective flow rates of both slurry streams in lines 50 and 60 and both streams of free-oxygen containing gas in lines 70 and 73. Flow control valves 77 and 76 remain open. The design value for the ratio of the oxygen atoms in the free-oxygen containing gas to the carbon atoms in the solid carbonaceous fuel slurry (O/C atomic ratio) in each section of the burner and in the reaction zone remains unchanged.

Speed controls 46 and 56 and valves 65 and 66 may be operated manually or automatically by control means 40, as previously described. The input to flow control means 40 may be manual or a signal from a computer, analyzer, or sensor. Control means 40 comprises conventional circuits and components for providing signals i.e. pneumatic or electronic to operate said speed controls and valves. The aforesaid procedure for reducing the total flow through the burner is applicable only when the discharge velocities for the various feedstreams do not fall below the flame propagation tion velocity.

Other ways of turning down burner 1 is by maintaining flow through either central conduit 4, or outer annular passage 6, and their respective tubes. This turndown procedure may be combined with the previously mentioned procedure in which the flow rate in either or both sections of the burner may be reduced, say up to 50%. Either manual or automatic control may be used to shut off one set of tubes and its related surrounding passage. By such means, two other ranges of flow may be obtained. For example, as shown in FIG. 3, one-third of the Design Conditions of flow through burner 1 may be achieved by only employing central conduit 4 and the associated central bunch of tubes 3. In such case valves 77 and 65 are open and valves 76 and 66 are closed. Valves 76 and 66 which are normally open may be closed manually or respectively by signals g and h from control means 40. This rate of flow may be further reduced, say up to 50% as previously described by now operating speed control 46 and partially closing valve 65. In another example, two-thirds of the Design Conditions of flow through burner 1 may be achieved by only employing flow through outer annular passage 6 and the associated annular bunch of tubes 7. In such case, valves 76 and 66 are open and valves 77 and 65 are closed. Valves 77 and 65 which are normally open may be closed manually or respectively by signals i and j from control means 40. This rate of flow may be further reduced say up to 50% by now operating speed control 56 and partially closing valve 66.

The size of the burner tubes and conduits may be changed for other splits. For example, in another embodiment, ¼ of the Design Conditions of flow for the fuel and oxidant streams may be passed through the central tubes and central conduit and the remaining ¾ of the Design Conditions of flow for the fuel and oxidant streams may be passed through the annular tubes and annular passage.

FIG. 4 is a vertical longitudinal schematic representation of another embodiment of the subject burner. Two pre-mix chambers in series are located in the central conduit and also in the annular passage. The ends of the central and annular bunches of tubes are retracted upstream from the face of the burner. In FIG. 4, burner 80 comprises central conduit 81 which in part constitutes the wall 82 between central passage 83 and coaxial radially spaced annular passage 84, two rows of a central bunch of parallel tubes 85 that pass longitudinally through the upper portion of central passage 83 and having upstream ends 86 that pass through tube sheet 87 making a gastight hermetic seal therewith, and downstream ends 88 which are retracted upstream from face 89 at the downstream end of burner 80, coaxial concentric radially spaced outer conduit 90 surrounding said annular passage 84 along its length, two rows of annular bunch of parallel tubes 95 that pass longitudinally through annular passage 84 with upstream ends 96 passing through tube sheet 96 and making an gastight seal therewith and having downstream ends 98 retracted upstream from face 89, annular manifold 100 in communication with the upstream ends 96 of said annular bunch of tubes 95, manifold 101 which may be cylindrical-shaped in communication with the upper ends 86 of said central bunch of tubes 85, inlet means 102 for introducing a first feedstream into said central manifold 101, inlet means 103 for introducing a second feedstream into said central passage 83 and in the interstices surrounding said central bunch of tubes 85, inlet means 104 for introducing a third feedstream into said annular manifold 100, inlet means 105 for introducing a fourth feedstream into said annular passage 84 and into the interstices surrounding the annular bunch of tubes 95, cooling coils 106 which encircle the outside diameter of outer conduit 80 along its length, and cored cooling chamber 107 at the downstream tip of the burner.

Disc shaped central tube sheet 87 closes off central passage 83 below its upstream end. Similarly, annular shaped tube sheet 97 closes off annular passage 84 below its upper end. Conventional means i.e. welding, turning, crimping, threading, rolling may be employed to provide a pressure and gastight hermetic seal or joint where the central and annular bunches of tubes penetrate the respective tube sheets. Mechanical pressure fittings and coupling devices may be also employed.

Plate 108 which may be disc-shaped seals off the upper end of central conduit 81. The space between plate 108 and tube sheet 87 constitutes said central manifold 101. By this means, for example, a portion of a first reactant feedstream in feed pipe 102 may be introduced into central manifold 101 and then split into a plurality of streams which pass through tube sheet 87 and the individual tubes in central bundle 85. Annular shaped disc 109 seals off the upper end of annular passage 84. The space between annular disc 109 and annular tube sheet 97 constitutes annular manifold 100. Simultaneously and concurrently with the introduction of the first reactant feedstream, the third reactant feedstream in feed pipe 104 may be introduced into annular manifold 100, split into a plurality of streams which pass through tube sheet 97 and the individual tubes in annular bundle 95.

Wall brackets or tube spacers 115 hold the individual tubes in annular tube bundle 95 in a fixed parallel nontouching relationship with respect to each other and the inside of outer conduit 90. Similarly, wall brackets or tube spacers 116 hold the individual tubes in central tube bundle 85 in a fixed parallel nontouching relationship with respect to each other, the inside diameter of central conduit 81, and the outside diameter of central conduit 81.

While the pre-mix zones in the embodiment in FIG. 4 are shown as comprising two separate coaxial central premix chambers 117 and 118 in series in central conduit 83, and two separate coaxial annular pre-mix chambers 119 and 120 in series in annular passage 84, the pre-mix zone of other embodiments of the subject invention may actually comprise one or more, such as 2 to 5 coaxial central and/or annular pre-mix chambers. Each central pre-mix chamber, except for the first chamber in the line, comprises a coaxial cylindrical body portion 121 followed by a coaxial at least partially converging frusto-conical outlet portion 122 that may optionally develop into a normal cylindrical portion 123. This outlet portion is shown in FIG. 4 as a converging central nozzle 124 which terminates at the downstream face of the burner. Optionally, nozzles 124 and 133 to be further described may be made from a thermal and wear resistant material i.e. silicon carbide or tungsten carbide.

The first central pre-mix chamber in the line may have a straight coaxial cylindrical body portion 125, that discharges through circular orifice 126 directly into the next in line central coaxial pre-mix chamber 118. Preferably, the inlet to the first central pre-mix chamber 117 is a portion of a converging frusto-conical shaped section 127.

Each of the coaxial annular shaped pre-mix chambers 120 except the first annular shaped chamber 119 comprises a coaxial generated normal cylindrical annular body portion 130 followed by a coaxial generated at least partially converging frusto-conical shaped annular outlet portion 131 that may optionally develop into a coaxial generated normal cylindrical annular portion 132. This outlet portion is shown in FIG. 4 as a converging annular exit nozzle 133 which terminates at the downstream face of the burner. The first coaxial annular shaped pre-mix chamber 119 comprises a coaxial generated normal cylindrical annular body portion 134 that discharges through annular orifice 135 into the next in line coaxial annular shaped pre-mix chamber 120. Preferably, the inlet to the first annular shaped pre-mix chamber 119 comprises a portion of a coaxial generated converging frusto-conical shaped section 136.

Cored faceplate 107 comprises a front portion 137 at the extreme tip of the burner, which may be flat or curved, and which contains a coaxial central annular shaped cooling chamber 138 surrounding the central conduit exit nozzle 124 and/or a coaxial radially spaced annular shaped cooling chamber 139 surrounding said annular exit nozzle 133 at the tip of the burner. The cooling chamber may be joined to the otherwise flat burner tip such as shown in FIG. 1, or it may be an extension of the central and outer conduits. Cold cooling water in line 140 enters annular shaped cooling chamber 139, splits by means of baffles and flows about 180°, and leaves by way of an opposite outlet which is connected to outer coils 106. Cooling water is introduced into central annular cooling chamber 138 by way of line 145 which is connected to passage 146 that passes longitudinally down through wall 82 in central conduit 81. The cool water splits by means of baffles, flows about 180° around central cooling channel 138, and leaves by way of an opposite coaxial longitudinal passage (not shown) similar to passage 146 but is another location in wall 82.

Optionally, a gaseous feedstream selected from the group consisting of steam, free-oxygen containing gas, $CO_2$, $N_2$, fuel gas, recycle portion of the product gas, and mixtures thereof may be introduced into at least one of the central and/or annular pre-mix chambers by way of at least one inlet pipe 149 which is connected to at least one longitudinal passage 147 in wall 82 of central conduit 81, and at least one branch passage 148 connecting longitudinal passage 147 with said pre-mix chambers.

Although modifications and variations of the invention may be made without departing from the spirit and scope thereof, only such limitations should be imposed as are indicated in the appended claims.

We claim:
1. A method for controlling the partial oxidation of a first reactant stream comprising a pumpable carbonaceous fuel slurry stream and a second reactant stream comprising a free-oxygen containing gas in the reaction zone of a gas generator comprising:
(1) introducing said first and second reactant streams into the reaction zone of a vertical free-flow non-catalytic refractory lined synthesis gas generator where said partial oxidation reaction takes place by way of a two-section burner mounted downward through an inlet port in the top of said gas generator and comprising central and annular sections with first and second fluid passage means in said central section and third and fourth fluid passage means in said annular section, a separate inlet means connected to each of said separate passage means, said burner having connected respectively to the two separate inlet means in the central section of said burner two separate feedlines 1 and 3 and having connected respectively to the two separate inlet means in the annular section of said burner two separate feedlines 2 and 4; wherein one feedstream of carbonaceous fuel slurry is passed through either the first or second fluid passage means in the central section of the burner and/or simultaneously another feedstream of carbonaceous fuel slurry is passed through the third or fourth fluid passage means in the annular section, and a separate feedstream of free-oxygen containing gas and if necessary a separate feedstream of steam are simultaneously passed through the unoccupied fluid passage means in each of the central and/or annular sections of said burner which are associated with the fluid passage means through which the stream(s) of carbonaceous fuel slurry are passing, said burner discharging into said reaction zone; and wherein the central section of said burner includes a central conduit, said central conduit being closed at the upstream end and having a unobstructed downstream circular exit orifice at the tip of the burner; said annular section being bounded by an outer conduit coaxial and concentric with said central conduit along its length and in spaced relationship therewith and forming an annular passage therebetween, said annular passage being closed at the upstream end and having an unobstructed downstream annular exit orifice at the tip of the burner and wherein the central longitudinal axis of the annular passage is parallel to the central longitudinal axis of the burner throughout its length; said first passage means comprising a central bunch of tubes passing through the closed end of said central conduit and making a gastight seal therewith, and wherein the downstream ends of said central bunch of tubes are retracted upstream from the burner face a distance of about 0 to 12 times the minimum diameter of the central conduit exit orifice at the tip of the burner; said second passage means comprising the space between the inside wall of said central conduit and the outside surfaces of the central bunch of tubes; said third passage means comprising an annular bunch of tubes passing through the closed end of said annular passage and making a gas tight seal therewith, and wherein the downstream ends of said annular bunch of tubes are retracted upstream from the burner face a distance of about 0 to 12 times the minimum width of the annular exit orifice at the tip of the burner; and said fourth passage means comprising the space between the inside wall of the outer conduit and the outside surfaces of the annular bunch of tubes;
(2) separately sensing the flow rates for that portion of the first reactant stream flowing through feedlines 1 and 2 and that portion of the second reactant stream flowing through feedlines 3 and 4 and providing to a separate control means signals a, d and b, e corresponding respectively to the actual flow rates of the portions of said first and second reactant streams flowing in feedlines 1, 2 and 3, 4; and (3) comparing in said separate control means said actual flow rate signals a, d, b and e with manual or automatically computed input signals representing the desired flow rate or set point for each of the reactant streams in the four feedlines and providing corresponding adjustment signals c and f to separate speed controlled positive displacement pumps in feedlines 1 and 2 respectively, and signals h and j to flow control valves in feedlines 3 and 4 respectively, and thereby controlling the flow rates of said portions of first and second reactant streams flowing in said four feedlines in accordance with the respective desired flow rate or set point of each, to maintain in the reaction zone an atomic ratio of oxygen to carbon in the range of about 0.5–1.95.

2. The method of claim 1 provided with the steps of passing portions of the first and second reactant streams through the first section of the burner only by completely stopping the flow of the portions of the first and second reactant streams passing through feedlines 2 and 4, respectively, by automatically closing flow control valves in feedlines 2 and 4 by signals g and h respectively from said separate control means, or by manually closing a flow control valve in feedline 2 and automatically closing the flow control valve in feedline 4.

3. The method of claim 1 provided with the steps of passing portions of the first and second reactant streams through the second section of the burner only by completely stopping the flow of the portions of the first and second reactant streams passing through feedlines 1 and 3, respectively, by automatically closing flow control valves in feedlines 1 and 3 by signals i and j respectively from said separate control means, or by manually closing a flow control valve in feedline 1 and automatically closing the flow control valve feedline 3.

4. The method of claim 1 wherein the flow rate of the reactant stream in feedlines 1 and/or 3 is adjusted up or down over a range of up to 50% of the maximum design flow rate through each.

5. The method of claim 1 wherein the flow rate of the reactant stream in feedlines 2 and/or 4 is adjusted up or down over a range of up to 50% of the maximum design flow rate through each.

* * * * *